United States Patent Office 3,359,212
Patented Dec. 19, 1967

3,359,212
AQUEOUS MIXTURE AND SILICONE OIL IN WATER EMULSION CONTAINING SILOXANE WETTING AGENTS
Donald L. Bailey, Sistersville, W. Va., assignor to Union Carbide Corporation, a corporation of New York
No Drawing. Original application June 19, 1964, Ser. No. 376,549, now Patent No. 3,299,112, dated Jan. 17, 1967. Divided and this application Aug. 5, 1966, Ser. No. 570,401
6 Claims. (Cl. 252—312)

ABSTRACT OF THE DISCLOSURE

This invention relates to the use of a small class of low molecular weight, hydrolytically stable siloxane-oxyalkylene copolymers as wetting agents in aqueous solutions and in silicone oil in water emulsions. The ability of these specific copolymers to promote wetting is far superior to that of other copolymers in the same general class.

This application is a division of application Ser. No. 376,549, filed June 19, 1964, said application is now U.S. Patent 3,299,112, and the latter application is a continuation-in-part of application Ser. No. 823,290, filed June 29, 1959, now abandoned.

This invention relates to organosilicon compounds and, in particular, to alkoxypoly(ethyleneoxy)siloxanes that are particularly useful as wetting agents in aqueous systems.

This invention provides novel siloxanes containing only (a) an alkoxypoly(ethyleneoxy)siloxane group and (b) from 1 to 4 methyl- and/or ethyl-siloxane groups. More specifically, this invention relates to siloxanes containing only (a) one group having the formula:

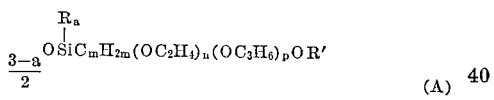

and (b) from 1 to 4 groups having the formula:

wherein:
(1) $a$ has a value from 0 to 2 inclusive;
(2) $b$ has a value from 2 to 3 inclusive;
(3) R is a methyl or an ethyl group;
(4) R' is an alkyl group containing from 1 to 4 carbon atoms inclusive (i.e., a methyl, ethyl, propyl or butyl group);
(5) $m$ has a value from 2 to 4 inclusive;
(6) $n$ has an average value from about 4 to 17 inclusive;
(7) $p$ has an average value from 0 to 5 inclusive;
(8) the ratio of $n$ to $p$ is at least 2 to 1;
(9) $n+p$ has a value from about 4 to 17 inclusive (preferably from 4 to 12 inclusive); and
(10) the alkoxypoly(ethyleneoxy) group is attached to the silicon atom of formula (A) through at least two carbon atoms of the $C_mH_{2m}$ group.

These siloxanes are often mixtures whose average composition can be represented by formulae (A) and (B) above, wherein $n$ and $p$ can have fractional values.

Three preferred classes of the siloxanes of this invention are those having the formulae:

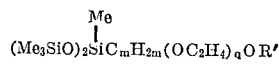
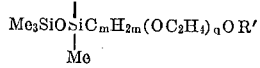
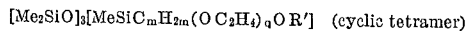

[Me$_2$SiO]$_3$[MeSiC$_m$H$_{2m}$(OC$_2$H$_4$)$_q$OR'] (cyclic tetramer)

wherein $q$ has an average value from about 4 to 12 inclusive, Me represents a methyl group and the remaining symbols have the meanings defined above.

Specific siloxanes of this invention are illustrated by those having the following formulae:

Me$_3$SiO[MeO(C$_2$H$_4$O)$_{7.2}$C$_3$H$_6$SiMeO]SiMe$_3$
(Me$_3$SiO)$_3$SiC$_3$H$_6$(OC$_2$H$_4$)$_{12}$OMe
Me$_3$SiOSiMe$_2$C$_3$H$_6$(OC$_2$H$_4$)$_6$OMe

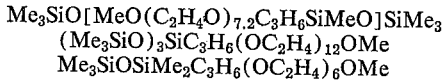
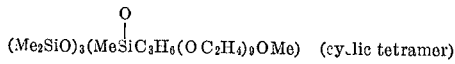
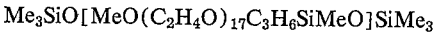

Me$_3$SiO[MeO(C$_2$H$_4$O)$_{17}$C$_3$H$_6$SiMeO]SiMe$_3$

The siloxanes of this invention are readily prepared by an addition reaction between a hydrosiloxane (i.e. a siloxane containing silicon-bonded hydrogen) and an alkenyl ether (e.g., a vinyl, allyl, or methallyl ether) of an alkoxy and hydroxy end-blocked poly(ethylene-oxide). The reaction conditions employed in addition reactions of this type are well known in the art and in general involve heating the reactants (e.g., at a temperature of from about 85° C. to 110° C.) in the presence of a platinum catalyst (e.g., chloroplatinic acid) and a solvent (e.g., toluene).

The siloxanes of this invention are remarkably effective in promoting the wetting of various surfaces, particularly surfaces that are difficult to wet, by aqueous emulsions and solutions. This property makes the siloxanes admirably suited as additives for aqueous paints, adhesives, printing inks, dyeing baths and emulsions which must thoroughly wet surfaces in order to function properly. The siloxane is desirably added to the water in such systems in an amount from 0.001 to 2 parts by weight per 100 parts by weight of the water. The effectiveness of the siloxanes of this invention as wetting agents is far superior to that of other siloxanes of similar structure as demonstrated in the examples presented below. In particular, the siloxanes of this invention are useful as wetting agents in silicone oil-in-water emulsions wherein the silicone oil is a diorganopolysiloxane having the formula:

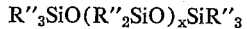

wherein R'' is a hydrocarbyl group and $x$ has a value from 10 to 1,000. Illustrative of the monovalent hydrocarbon (hydrocarbyl) groups that are represented by the R'' in the latter formula are the alkenyl groups (for example, the vinyl group and the allyl group); the cycloalkenyl groups (for example, the cyclohexenyl group); the alkyl groups (for example, the methyl, ethyl, isopropyl, octyl, dodecyl, octadecyl and eicosyl groups); the aryl groups (for example, the phenyl, naphthyl, and terphenyl groups); the aralkyl groups (for example, the benzyl and the phenylethyl groups); the alkaryl groups such as, the styryl, tolyl and n-hexylphenyl groups, and the cycloalkyl groups (for example, the cyclohexyl group). Preferably, the silicone oil is a dimethylpolysiloxane having the formula:

$$Me_3SiO(Me_2SiO)_xSiMe_3$$

where $x$ has a value from 50 to 400. In such emulsions, the silicone oil is preferably present in an amount from 1.0 to 5 parts by weight per 100 parts by weight of water in the emulsion. The siloxane of this invention is preferably present in the emulsion in an amount from 0.1 to 0.5 parts by weight per part by weight of the water in the emulsion. In such emulsions, the siloxanes of this invention function as an emulsifying agent as well as wetting agents. Such emulsions can also contain conventional organic emulsifying agents such as those described below in the examples. Such emulsions can be prepared by conventional means. These emulsions are useful for treating uncured rubber (e.g. neoprene) articles prior to the molding thereof to facilitate the subsequent release of the cured molded rubber product from the mold. Alternately the molds themselves can be pre-treated with such emulsions. In addition, the emulsions are useful in treating asphalt floor tiles prior to packing and shipment to minimize adhesion of the tiles to each other.

In addition, the siloxanes of this invention can be added to any of a variety of other aqueous systems to improve the wetting of various surfaces by such systems. By way of illustration, the siloxanes can be added to aqueous paints, aqueous adhesive compositions, aqueous printing inks, aqueous dyeing baths and aqueous mold release compositions to improve the wetting of such materials as polyethylene, steel, aluminum, wood, fibrous materials or Teflon.

The following examples illustrate the present invention.

EXAMPLE 1

A siloxane of this invention was produced by forming a mixture of 60.0 grams of toluene and 39.0 grams (0.1 mol) of $CH_2=CHCH_2(OC_2H_4)_{7.2}OMe$ in a 300 milliliter flask connected to a distillation column fitted with a distillation head, a receiver and a Dry Ice trap. The flask is swept with a nitrogen purge. A small amount of water present in the mixture was removed by azeotropic distillation. Then 24.4 grams (0.110 mol) of $$Me_3SiO(MeSiHO)SiMe_3$$

was added to the flask. Two drops ($6 \times 10^{-6}$ mol) of chloroplatinic acid dissolved in ethanol were then added to the flask and the contents of the flask were heated 175° C. for 17 hours. The reaction product was cooled to 25° C. and activated charcoal was added. The mixture of the activated charcoal and the reaction product was filtered through a filter medium to remove the activated charcoal and the platinum (adsorbed on the charcoal). The toluene was removed from the reaction product by distillation and volatile materials were removed from the reaction product by heating at 150° C. at one millimeter of mercury pressure for one hour. The final product was a siloxane of this invention having the formula:

$$(Me_3SiO)_2\overset{Me}{\underset{|}{Si}}C_3H_6(OC_2H_4)_{7.2}OMe$$

This siloxane is referred to hereinafter as "Siloxane I" (abbreviated "Sil I").

The following examples illustrate the use of siloxanes of this invention as wetting agents.

In the examples appearing below, the ability of emulsions and aqueous solutions to wet various surfaces was measured by the following procedure: By means of a syringe exactly 0.02 milliliters of emulsion (or solution) was deposited on the substrate. After three minutes the average diameter of the drop was measured by means of a vernier caliper. Tests were run in triplicate. Percent increase in drop diameter was calculated as follows:

$$\text{Percent increase in drop diameter} = \frac{B-A}{A} \times 100$$

A = diameter of drop of distilled water applied to the surface in the same manner.
B = diameter of drop of test emulsion (or solution) after 3 minutes.

In the examples appearing below, the siloxanes of this invention are compared to various commercially available wetting agents and emulsifying agents. The commercially available wetting agents and emulsifying agents are as follows:

| Trade name: | Composition |
|---|---|
| Tergitol Anionic 7 | Aqueous solution containing 25 weight percent sodium heptadecylsulfate (balance water). |
| Tergitol TMN | Aqueous solution containing 90 weight percent polyoxyethylated trimethylnononol (balance water). |
| Alconox | Alkylarylsulfonate. |
| Aerosol AY | Sodium diamylsulfosuccinate. |
| Dowfax 9N9 | $C_9H_{19}\phi O(C_2H_4O)_{9.5}H(\phi 15 - C_6H_4)$. |

In the examples, the trade name or the composition or both are used to identify these materials.

In certain of the examples appearing below, the following abbreviated symbols are used to represent various groups that compose siloxanes of this invention and to represent starting siloxanes from which they are produced. In addition these symbols are used to represent other siloxanes whose wetting properties are described for comparison purposes.

| Symbol: | Group |
|---|---|
| M | $Me_3SiO_{1/2}$ |
| D | $Me_2SiO$ |
| T' | $-CH_2CH_2CH_2SiO_{3/2}$ |
| M' | $\underset{Me_2SiO_{1/2}}{\overset{CH_2CH_2CH_2O-}{|}}$ |
| D' | $\underset{MeSiO}{\overset{CH_2CH_2CH_2-}{|}}$ |
| Me | $CH_3$ |
| D" | $MeSiHO$ |
| M" | $Me_2SiHO_{1/2}$ |
| T" | $HSiO_{3/2}$ |

In the following examples, the dimethylsiloxane oils used had the formula $Me_3SiO(Me_2SiO)_{200}SiMe_3$.

EXAMPLE II

The following emulsions (formulations) were formed by mixing the indicated ingredients.

| Formulation | Weight Percent | | | | |
|---|---|---|---|---|---|
| | Dimethyl-siloxane oil | Water | Sil. I | Polyoxyethylated Fatty Alcohols [1] | Polyoxyethylated Nonylphenol |
| A | 35 | 61.5 | | 3.5 | |
| B | 35 | 61.5 | 2.6 | | [2] 0.9 |

[1] A mixture of 1.75 wt. percent Brij 30 and 1.75 wt. percent Brij 35.
[2] Sergitol NP 35.

Two portions of Emulsion A was diluted with water to 3.5 and 1.0 wt.-percent dimethylsiloxane oil respectively, the diluted emulsions being designated A–3.5 and A–1, respectively. Similarly, Emulsion B was diluted with water to 3.5 and 1.4 wt.-percent dimethylsiloxane oil respectively, the diluted emulsions being designated B–3.5 and B-1. Wetting by these diluted emulsions was measured on clean aluminum and cold-rolled steel surfaces:

|  | Percent Increase in Drop Diameter | |
|---|---|---|
|  | Steel | Aluminum |
| A-3.5 | 53 | 35 |
| A-1 | 58 | 39 |
| B-3.5 | 96 | 79 |
| B-1 | 111 | 92 |

The results demonstrate the greater wetting power of an emulsion containing Siloxane I (prepared as described in Example I above), as the wetting agent as well as the primary emulsifier compared with an emulsion containing only an organic emulsifier.

EXAMPLE III

The following emulsions were formed by mixing the indicated ingredients.

| Formulation | Dimethyl-siloxane oil | Sil. I | H₂O | Polyoxy-ethylated Fatty Alcohol [1] |
|---|---|---|---|---|
| A | 35 | 3.5 | 61.5 | |
| B | 35 | | 61.5 | 3.5 |

[1] Brij 35.

Both of these emulsions were diluted with water to 1 wt. percent dimethylsiloxane oil. Diluted A and B were called A-1 and B-1, respectively. To an aliquot of B-1 was added 0.1 wt. percent Siloxane I. This modified emulsion was designated V-2. The results of wetting of uncured freshly-sheeted neoprene with these emulsions were:

Percent increase in drop diameter
A-1 _____ 87
B-1 _____ 32
B-2 _____ 80

These results demonstrate the better wetting resulting from using Siloxane I as the only emulsifier (A-1) or addition of Siloxane I to an emulsion containing an organic emulsifier (B-2).

EXAMPLE IV

The following emulsions were formed by mixing the indicated ingredients.

Formulation A: Weight percent
Dimethylsiloxane oil _____ 35.0
Me₃SiO(Me₂SiO)₈.₅[MeO(C₂H₄O)₁₆C₃H₆-SiMeO]₃.₅SiMe₃ _____ 3.5
Water _____ 61.5

Formulation B [1]: Weight percent
Dimethylsiloxane oil _____ 35.0
Polyoxyethylated nonylphenols (a mixture of 2.1 wt. percent Renex 678 and 1.4 wt. percent Renex 690) _____ 3.5
Water _____ 61.5

[1] Also contains 0.3 part by weight of a preservative for controlling bacteria.

Formulation C [2]: Weight percent
Dimethylsiloxane oil _____ 35.0
Me₃SiO[MeO(C₂H₄O)₇C₃H₆SiMeO]SiMe₃ ____ 2.6
Polyoxyethylated nonylphenol (Tergitol NP35) 0.9
Water _____ 61.5

[2] Also contains 0.3 part by weight of a preservative for controlling bacteria.

Emulsions A, B, and C were diluted with water to 3.5% dimethylsiloxane oil. These diluted emulsions were called A-1, B-1, and C-1, respectively. To aliquots of each diluted emulsion was added 0.2 wt. percent Siloxane I, these emulsions being then designated A-2, B-2, and C-2. Wetting tests were run on uncured neoprene sheet and also polyethylene sheet.

| Sample | Percent Increase in Drop Diameter | |
|---|---|---|
|  | Neoprene | Polyethylene |
| A-1 | 9 | 27 |
| A-2 | 45 | 61 |
| B-1 | 11 | 41 |
| B-2 | 36 | 75 |
| C-1 | 85 | 102 |
| C-2 | 117 | 175 |

For all three emulsions, addition of Siloxane I improved the spreading, or wetting, on both neoprene and polyethylene. The effect was demonstrated where the initial emulsifiers were a siloxane-oxyalkylene copolymer (not of the class used in this invention) only (A), an organic wetting agent only (B) and combination of an organic wetting agent with Siloxane I (C).

EXAMPLE V

The following emulsions were formed by mixing the indicated ingredients.

Formulations: Weight percent
(A)
Dimethylsiloxane oil _____ 35.0
Water _____ 61.5
Polyoxyethylated fatty alcohol (a mixture of 1.75 wt. percent Brij 30 and 1.75 wt. percent Brij 35) _____ 3.5
(B)
Dimethylsiloxane oil _____ 35.0
Water _____ 61.5
Polyoxyethylated fatty acid esters (a mixture of 2.34 wt. percent Tween 80 and 0.29 wt. percent Atmos 300) _____ 2.63

Each emulsion was diluted 20/1, i.e., 20 parts H₂O/1 part above concentrates. To separate portions of diluted Formulation A was added:

Weight percent
Siloxane I _____ 1.5
Tergitol Anionic 7 (25% aqueous sodium heptadecyl sulfate solution) _____ 1.5
Tergitol TMN (90% polyoxyethylated trimethyl nonanol aqueous solution) _____ 1.5

Drops of each of these three emulsions, and also drops of a control (no added wetting agent) were applied by medicine dropper to a varnished wooden panel and the degree of spreading (i.e., degree of wetting) observed. A calibrated syringe test was not used in this experiment. The emulsion containing Siloxane I gave excellent wetting (i.e. increase in drop diameter was over 300% within three minutes). In contrast, the other three emulsions gave poor wetting.

To diluted portions of diluted Formulation B was added:

Weight percent
Siloxane I _____ 0.6
Tergitol Anionic 7 _____ 1.2
Tergitol TMN _____ 1.2

Drops of each of these three emulsions, and also drops of a control, were applied to a varnished wooden panel. As in formulation A, Siloxane I have excellent wetting, i.e., greater than 300% increase in drop diameter. The other emulsions gave poor wetting.

EXAMPLE VI

This example illustrates the superior wetting of steel, glass, polyethylene and Teflon by aqueous solutions containing small amounts of Siloxane I. For comparison purposes, the wetting of such surfaces by aqueous soluons containing commercially available wetting agents and a siloxane not of this invention (Siloxane A) was also measured. "Siloxane A" has the formula:

$$Me_3SiO(MeO(C_2H_4O)_7C_3H_6SiMeO)_2SiMe_3$$

The results of these wetting tests are shown in Table I below. In the table, "wets" indicates that the droplet of the test solution increased in diameter over 300 percent. The numerical values in the table indicate the percent increase in diameter of the droplet of test solution applied to the surface.

TABLE I

| Surfactant | Wt. Percent Conc. | Percent Increase in Diameter of a Water Droplet (0.02 ml.) after 3 min.[1] | | | |
|---|---|---|---|---|---|
| | | Steel | Glass | Polyethylene | Teflon |
| Siloxane I | 1.0 | Wets | Wets | Wets | 151 |
| Do | 0.1 | Wets | Wets | Wets | 118 |
| Do | 0.01 | Wets | 145 | 170 | 67 |
| Iconox | 1.0 | 194 | 61 | 109 | 56 |
| Do | 0.1 | 47 | 14 | 35 | 20 |
| Do | 0.01 | 0 | 4.5 | 12 | 13 |
| Aerosol AY+15% Na₂SO₄ [2] | 1.0 | 122 | 109 | 142 | 97 |
| Aerosol AY+15% Na₂SO₄ | 0.1 | 47 | 50 | 86 | 67 |
| Aerosol AY+15% Na₂SO₄ | 0.01 | 33 | 4.5 | 14 | 5.1 |
| Dowfax 9N9 | 1.0 | 126 | 52 | 91 | 44 |
| Siloxane A | 1.0 | Wets | 152 | 146 | 69 |
| Do | 0.1 | Wets | 77 | 126 | 69 |

[1] Wetting—Good: >300% increase in droplet diameter (wets); fair: 100 to 300% increase in droplet diameter; poor: <100% increase in droplet diameter.
[2] Na₂SO₄ added to decrease solubility of Aerosol AY.

EXAMPLE VII

In this test, a modification of the standard Draves Test was used. The modification is described by L. Shapiro in "American Dyestuff Reporter," 39, 38 (1950). The test involves placing woven canvas tape on the surface of the test solution and measuring the time required for the tape to become totally immersed (sink) in the solution. In each test the solution consisted of water and the indicated amount of the wetting agent. For comparison purposes, the results obtained with a commercially available wetting agent (Aerosol OT) are also shown in Table II. The results obtained with both wetting agents at 0.1 and 0.1 weight percent concentration are equivalent. The results obtained at 0.01 and 0.001 weight percent concentration show the superiority of Siloxane I.

TABLE II

| Aerosol OT | | Siloxane I | |
|---|---|---|---|
| Wt. Percent Conc. | Sinking Time (sec.) | Wt. Percent Conc. | Sinking Time (sec.) |
| 1.0 | 0 | 1.0 | 1 |
| 0.1 | 4 | 0.1 | 5 |
| 0.01 | 34 | 0.01 | 17 |
| 0.001 | 50 | 0.001 | 40 |

EXAMPLE VIII

This example illustrates the importance of having about at least four ethylene oxide units in siloxanes of this invention. As is shown in Table III, for a "homologous" series of siloxanes differing only by the average number of oxyethylene units (i.e. differing only by the average value of the subscript $x$) poor wetting is obtained when the siloxane has fewer than about four oxyethylene. In each run in Table III a mixture of siloxanes (1.0 wt. percent) having various numbers of oxyethylene units was added to water to form the test solution.

TABLE III

| 1.0 wt. percent Conc. of Siloxanes having formula MM'(OC₂H₄)ₓOMe (x=n) | Percent Increase in Diameter of a Water Droplet (0.02 ml.) after 3 min. | | |
|---|---|---|---|
| | Steel | Glass | Polyethylene |
| 1.8–2.7 | 51 | 19 | |
| 3.2–3.6 | 123 | 212 | 97 |
| 3.9–4.3 | Wets | Wets | 228 |
| 4.3–4.6 | Wets | Wets | 117 |
| 4.9–5.3 | Wets | 62 | |

EXAMPLE IX

This example illustrates the wetting of polyethylene and Teflon surfaces by aqueous solutions containing one weight percent of siloxanes of this invention.

TABLE IV

| Me(Me₃SiO)₂SiCH₂CH₂CH₂O(C₂H₄O)ₓMe (x=n) | Percent Increase in Diameter of a Solution Droplet (0.02 ml.) After 3 Minutes | |
|---|---|---|
| | Polyethylene | Teflon |
| 4.4–5.1 | Wets | 118 |
| 5.1–5.7 | Wets | 126 |
| 5.8–6.5 | Wets | 138 |
| 6.2–7.0 | Wets | 144 |
| 7.0–8.8 | Wets | 97.4 |

EXAMPLE X

This experiment demonstrates the superior performance of the siloxanes of this invention as wetting agents in water as compared to other siloxanes.

TABLE V

| 1 Wt. Percent Aqueous Solution of— | Wetting Percent Increase in Droplet Diameter | |
|---|---|---|
| | Glass | Polyethylene |
| Siloxanes of This Invention:[1] | | |
| D₃[D'(C₂H₄O)₇Me] [2] | 225 | Wets |
| D₃[D'(C₂H₄O)₉.₂Me] [2] | 268 | 337 |
| MD₃M'(C₂H₄O)₁₀.₈Me | 223 | 281 |
| MD₃M'(C₂H₄O)₁₂.₄Me | 245 | 198 |
| M₃T'(C₂H₄O)₁₁.₂Me | Wets | Wets |
| MM'(C₂H₄O)₃.₅Me | Wets | Wets |
| MD'M(C₂H₄O)₆.₅Me | Wets | Wets |
| MD'M(C₂H₄O)₃.₅Me | | 277 |
| Other Siloxanes: | | |
| MD'M(C₂H₄O)₃.₄Me | | 67.4 |
| [M'(C₂H₄O)₂Me]₂O | 57 | 74 |
| [M'(C₂H₄O)₃Me]₂O | 109 | 116 |
| M[D'(C₂H₄O)₃Me]₃₇M | 111 | 51 |
| M[D'(C₂H₄O)₃Me]₃₇M | 57 | 86 |

[1] Symbols defined above after Example I.
[2] Cyclic tetramer.

EXAMPLE XI

This experiment demonstrates the superior performance of a siloxane of this invention as wetting agents as compared to other siloxanes.

TABLE VI

| 1 Wt. Percent Aqueous Solution of | Wetting of Polyethylene, Percent Increase in Droplet Diameter |
|---|---|
| Siloxanes of This Invention: MD′M($C_2H_4O$)$_{7.8}$Me | 225 |
| Other Siloxanes: | |
| [-$D_2$M′($C_2H_4O$)7.5Me]$_2$ | 144 |
| (MD$_3$)$_2$D′($C_2H_4O$)$_{16.3}$Me | 51 |
| [D′($C_2H_4O$)$_2$Me]$_4$ | 42 |
| [D′($C_2H_4O$)$_3$Me]$_4$ | 51 |
| M[D′($C_2H_4O$)$_3$Me]$_3$M | 62 |
| M[D′($C_2H_4O$)$_{4.6}$Me]$_3$M | 95 |
| MD′M($C_2H_4O$)$_3$Me | 67 |

EXAMPLE XII

The following table shows the superior wetting of polyethylene by various siloxanes of this invention produced by the above described addition reaction between hydrosiloxanes and allyl ethers of polyethylene oxides.

TABLE VII

| 1 Wt. Percent Aqueous Solution of Reaction Product of Equal Moles of— | | Wetting Percent Increase in Droplet Diameter |
|---|---|---|
| Siloxane | Ether* | |
| MDD″DM | AMPG547 | 214 |
| MDD″DM | AMPG627 | 200 |
| MD″M | AMPG398 | Wets |
| $D_3$D″ | AMPG380 | Wets |
| MM″ | AMPG209 | Wets |
| M$_3$T″ | AMPG610 | Wets |

* "AMPG" denotes the allyl ether of methoxy end-blocked polyethylene glycol (i.e. $CH_2$=$CHCH_2$($OC_2H_4$)$_x$OMe). The number following AMPG denotes the molecular weight of allyl ether.

What is claimed is:

1. A mixture consisting essentially of water and from 0.001 to 2 parts by weight per 100 parts by weight of the water of a siloxane composed of only (a) one group having the formula:

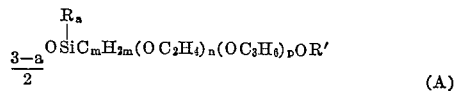

(A)

and (b) from 1 to 4 groups represented by the formula:

(B)

wherein:
(1) $a$ has a value from 0 to 2 inclusive;
(2) $b$ has a value from 2 to 3 inclusive;
(3) R is a methyl or an ethyl group;
(4) R′ is an alkyl group containing from 1 to 4 carbon atoms inclusive;
(5) $m$ has a value from 2 to 4 inclusive;
(6) $n$ has an average value from about 4 to 17 inclusive;
(7) $p$ has an average value from 0 to 5 inclusive;
(8) the ratio of $n$ to $p$ is at least 2 to 1;
(9) $n+p$ has a value from 4 to 17 inclusive; and
(10) the alkoxypoly(ethyleneoxy) group is attached to the silicon atom of formula (A) through at least two carbon atoms of the $C_mH_{2m}$ group.

2. A mixture as defined in claim 1 wherein the siloxane has the formula:

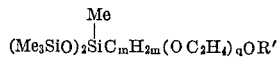

wherein $m$ has a value from 2 to 4 inclusive, $q$ has an average value from about 4 to 12 inclusive, R′ is an alkyl group containing from 1 to 4 carbon atoms inclusive and the alkoxypoly(ethyleneoxy) group is attached to the adjacent silicon atom through at least two carbon atoms of the group represented by $C_mH_{2m}$.

3. A mixture as defined in claim 1 wherein the siloxane has the formula:

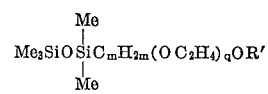

wherein $m$ has a value from 2 to 4 inclusive, $q$ has an average value from about 4 to 12 inclusive, R′ is an alkyl group containing from 1 to 4 carbon atoms inclusive and the alkoxypoly(ethyleneoxy) group is attached to the adjacent silicon atom through at least two carbon atoms of the group represented by $C_mH_{2m}$.

4. A mixture as defined in claim 1 wherein the siloxane is cyclic tetramer having the formula:

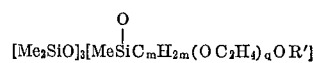

wherein $m$ has a value from 2 to 4 inclusive, $q$ has an average value from about 4 to 12 inclusive, R′ is an alkyl group containing from 1 to 4 carbon atoms inclusive and the alkoxypoly(ethyleneoxy) group is attached to the adjacent silicon atom through at least two carbon atoms of the group represented by $C_mH_{2m}$.

5. A silicone oil in water emulsion comprising (a) water, (b) from 0.1 to 5 parts by weight per 100 parts by weight of water of a silicone oil having the formula:

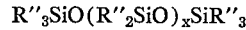

wherein R″ is a monovalent hydrocarbon group and $x$ has a value from 10 to 1000 and (c) from 1.0 to 2 parts by weight per part by weight of the oil of a siloxane as defined in claim 1.

6. The emulsion of claim 5 wherein the silicone is a dimethylpolysiloxane oil having the formula:

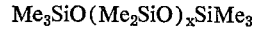

where $x$ has a value from 50 to 400.

References Cited

UNITED STATES PATENTS 2,846,458   8/1958   Haluska _____ 260—448.2
3,299,112   1/1967   Bailey _____ 260—448.2

LEON D. ROSDOL, *Primary Examiner.*

RICHARD D. LOVERING, *Examiner.*